(12) United States Patent
Onishi

(10) Patent No.: US 6,562,261 B2
(45) Date of Patent: May 13, 2003

(54) INJECTION MOLDING METHOD AND CONTROL SYSTEM FOR INJECTION MOLDING MACHINES

(75) Inventor: Masashi Onishi, Chiba (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 193 days.

This patent is subject to a terminal disclaimer.

(21) Appl. No.: 09/740,995

(22) Filed: Dec. 21, 2000

(65) Prior Publication Data

US 2001/0026031 A1 Oct. 4, 2001

(30) Foreign Application Priority Data

Apr. 4, 2000 (JP) .......................... 2000-102087

(51) Int. Cl.⁷ .............................. B29C 45/77
(52) U.S. Cl. ............... 264/40.1; 264/40.5; 264/328.1; 425/145; 425/147
(58) Field of Search ............. 264/40.1, 40.5, 264/40.7, 328.1, 328.8, 328.13; 425/145, 147, 542

(56) References Cited

U.S. PATENT DOCUMENTS

| 5,371,450 | A | | 12/1994 | Hiraoka |
| 5,665,282 | A | | 9/1997 | Nakamura |
| 5,770,131 | A | * | 6/1998 | Bubel et al. ............... 264/69 |
| 6,042,760 | A | * | 3/2000 | Nakazawa et al. ......... 264/40.1 |
| 6,416,694 | B1 | * | 7/2002 | Ishikawa ................. 264/328.8 |

FOREIGN PATENT DOCUMENTS

| EP | 0 965 430 | 12/1999 |
| EP | 0 965 431 | 12/1999 |
| EP | 1 018 421 | 7/2000 |
| JP | 04 250016 | 9/1992 |
| JP | 7-256712 | 10/1995 |

* cited by examiner

Primary Examiner—Jill L. Heitbrink
(74) Attorney, Agent, or Firm—Squire, Sanders & Dempsey, LLP (57) ABSTRACT

An injection molding method comprises the steps of melting molten resin within a heating cylinder, advancing an injection screw within the heating cylinder to inject the molten resin into a mold, retracting the injection screw to a predetermined position before completion of the injection, further advancing the injection screw under pressure control.

30 Claims, 6 Drawing Sheets

INJECTION MOLDING METHOD AND CONTROL SYSTEM FOR INJECTION MOLDING MACHINES

BACKGROUND OF THE INVENTION

The present invention relates to a method of controlling a filling process for injection molding machines, and a control device therefor.

An explanation will be given to a molding operation of an injection molding machine. In particular, an explanation will be given to the case of a motor driven injection molding machine to center on motions of an injection device.

(A) A servo-motor for driving rotation of a screw rotates the screw whereby resin falling on a rear portion of the screw from a hopper is melted and a given amount thereof is fed to a tip end of a heating cylinder. At this time, the screw retreats while being subjected to pressure of molten resin accumulating at the tip end of the heating cylinder.

Connected directly to the rear end of the screw is a drive shaft.

The drive shaft is rotatably supported on a pressure plate through bearings. The drive shaft is driven through a timing belt by a servo-motor for driving rotation of the screw. The pressure plate is driven through a ball screw by a servo-motor for injection to advance and retreat along guide bars. The foregoing pressure of molten resin is detected by a load cell in a manner described later. A detected value of the load cell is fed back by a feed-back control loop for pressures.

(B) Then driving of the servo-motor for injection causes the pressure plate to advance to fill molten resin into a metal mold with the screw tip end as a piston.

(C) At the end of the filling process, the molten resin fills a cavity of the metal mold. At that time, the advancing motion of the screw causes conversion of velocity control into pressure control. Such conversion of velocity control into pressure control is called a V-P conversion.

(D) Thereafter, the resin in the cavity of the metal mold becomes cold under a set pressure. Resin pressure is controlled in feed-back control loop like the above-mentioned pressure control.

In the injection device, when the process (D) is terminated, it goes back to the process (A) and shifts to the succeeding molding cycle. Meanwhile, in a mold clamping device, concurrently with the process (A), the metal mold is opened to permit an ejector mechanism to discharge a molding product having been cooled and solidified, and then the metal mold is closed to shift to the process (B).

Figure 1:
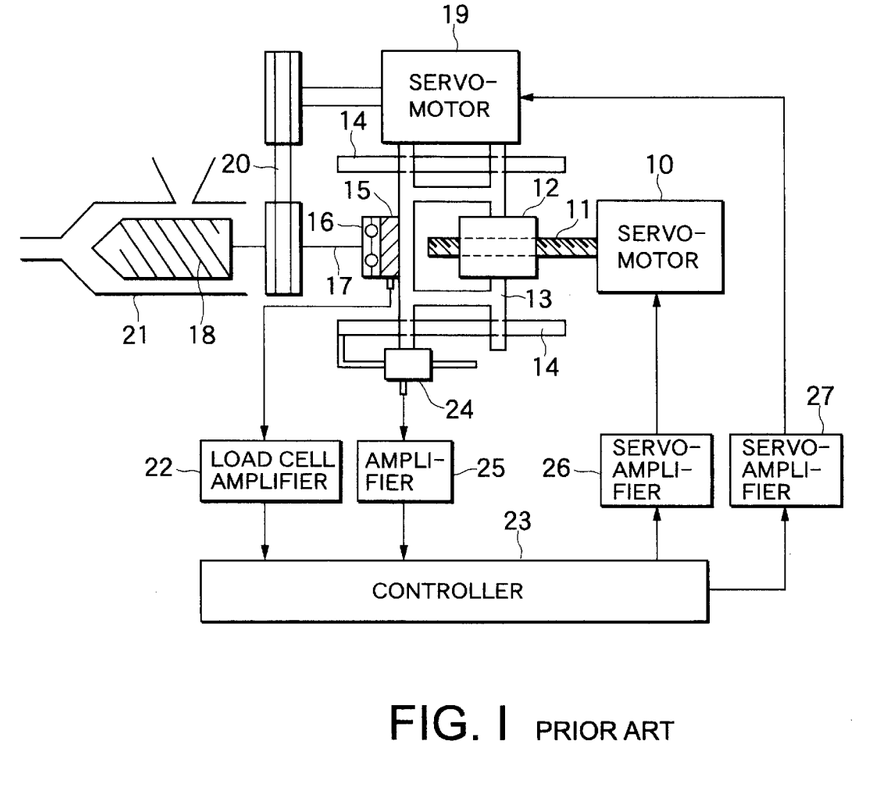
FIG. 1 is a view showing a motor driven injection molding machine with an injection device disposed centrally thereof.

With reference to FIG. 1, an explanation will be given hereinbelow to the molding motion of a motor driven injection molding machine to center on motions of an injection device. The injection device performs filling of molten resin by converting rotating motion of a servo-motor into linear motion with the use of a ball screw and a nut. In FIG. 1, rotation of the servo-motor 10 for injection is transmitted to a ball screw 11. A nut 12 adapted to advance and retreat upon rotation of the ball screw 11 is fixed to a pressure plate 13. The pressure plate 13 is movable along a plurality of guide bars 14 (only two being shown) fixed to a base frame (not shown). Advancing and retreating movements are transmitted to a screw 18 through a load cell 15, a bearing 16, and a drive shaft 17. The drive shaft 17 is also rotatingly driven through a timing belt 20 by a servo-motor 19 for driving rotation of the screw.

Rotating driving of the servo-motor 19 causes the screw 18 to retreat in a heating cylinder 21 while rotating whereby molten resin is accumulated at the tip end of the heating cylinder 21. And rotating driving of the servo-motor 10 causes advancement of the screw 18 to thereby fill the metal mold with the accumulated, molten resin and pressurize the resin for molding. At this time, forces, which push the resin, are detected as reaction forces by the load cell 15.

A detected value from the load cell 15 is amplified by a load cell amplifier 22 to be input into a controller 23. Mounted on the pressure plate 13 is a position detector 24 for detection of amounts of movements of the screw 18. A detected value from the position detector 24 is amplified by an amplifier 25 to be input into the controller 23.

In accordance with setting established by an operator, the controller 23 outputs to servo-amplifiers 26, 27 current (torque) commands depending upon the respective processes. The servo-amplifiers 26, 27 control drive currents of the servo-motors 10, 19 to control output torque of the motors.

In the above-mentioned injection device, pressure control is conventionally carried out after V-P conversion. Pressure control is slow in response speed. As a result, this is responsible for dispersion in weight of molding products and over-filling among molding products, for which rapid depressurization from the filling pressure to the dwelling pressure is required.

Figure 2:
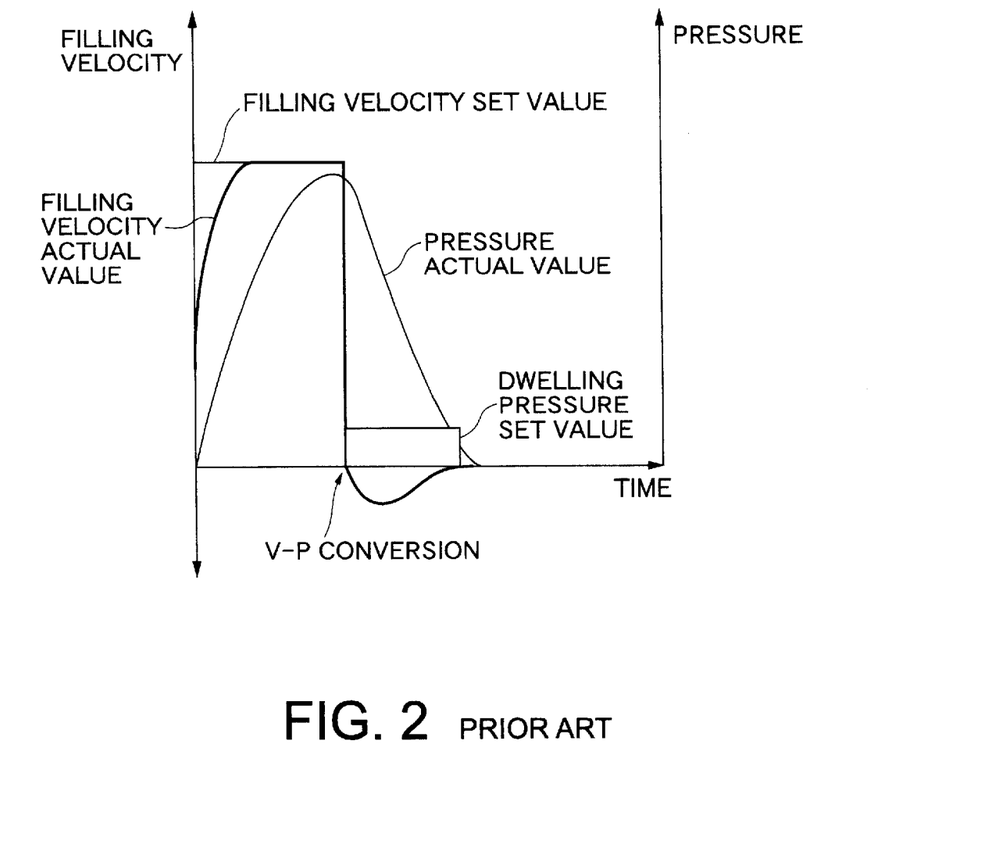
FIG. 2 is a view showing an example of varying waveforms of filling velocity and of resin pressure before and after a V-P conversion.

FIG. 2 shows an example of varying waveforms of filling velocity and of resin pressure before and after the V-P conversion. As apparent from FIG. 2, with the prior art, rapid depressurization is difficult due to slow response speed since it is switched to pressure control after the V-P conversion. For example, with molding products for DVD (Digital Video Disc) and connectors, a dwelling process is very short. In this case, the manner of depressurization after the V-P conversion affects a molding product much. On the other hand, with molding products, which require high injection velocities, pressure changes very fast, so that pressure cannot be controlled by the response of pressure control.

SUMMARY OF THE INVENTION

It is an object of the present invention to provide an injection molding method, which can achieve stability in quality of molding products by retreating a screw immediately before conversion from velocity control into pressure control to obtain a required pressure waveform.

It is another object of the invention to provide a control system suited for the above-mentioned method.

An injection molding method according to the present invention comprises the steps of melting molten resin within a heating cylinder, advancing an injection screw within the heating cylinder to inject the molten resin into a mold, retracting the injection screw to a predetermined position before completion of the injection, further advancing the injection screw under pressure control.

An injection molding machine control system according to the present invention comprises a velocity control system which comprises a position detecting unit for detecting a position of an injections screw, a position setting unit for providing a set value of a position of the injection screw, and a first feedback circuit for outputting a first speed command value to an injection motor based upon a difference between a detected value from the position detecting unit and the set value from the position setting unit. The system also comprises a pressure control system which comprises a pressure detecting unit for detecting a resin filing pressure, and a pressure setting unit for providing a set value of a filling pressure and a dwelling pressure, and a second feedback circuit for outputting a second speed command value to the injection motor based upon a difference between a detected value from the pressure detecting unit and the set value from the pressure setting unit. The system further comprises a switching unit for switching between an output of the first feedback circuit and second feed back circuit to provide a selected speed command value to the injection motor. The velocity control system is configured to perform a control action for returning the injection screw to a set at a predetermined velocity when the injection screw has advanced to a predetermined position during a filing process, and the switching unit switches to the second feedback circuit thereafter.

DESCRIPTION OF THE PREFERRED EMBODIMENTS

Figure 3:
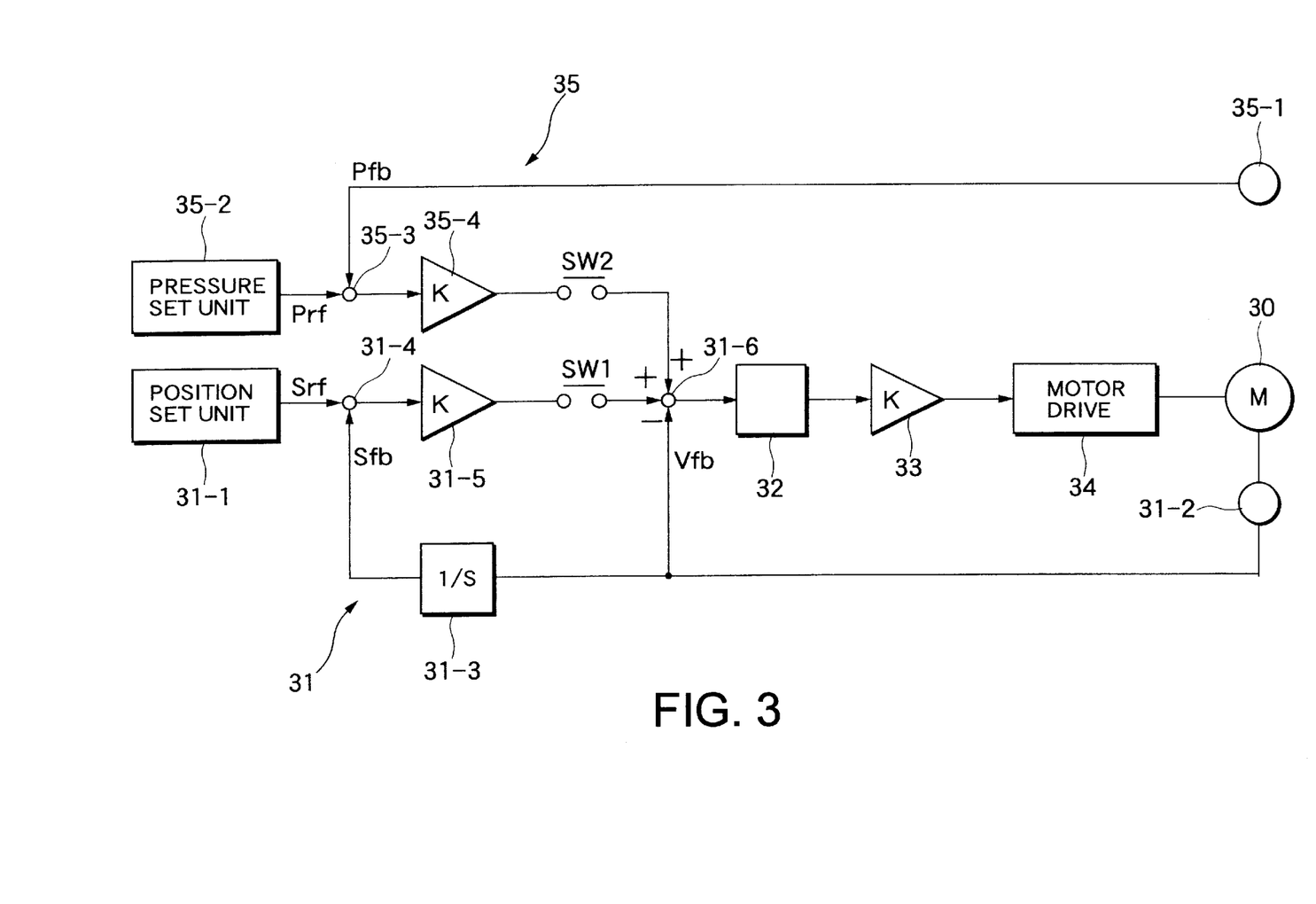
FIG. 3 is a block diagram showing a constitution of a drive control system of an injection motor according to the present invention.

Referring to FIG. 3, an explanation will be given to a control device for a motor driven injection molding machine, according to an embodiment of the present invention. The control device according to the present invention is applicable to a motor driven injection molding machine illustrated in FIG. 1. Therefore, an explanation will be given to the case, in which the servo-motor 10 for injection is controlled. The control device comprises a velocity control system 31 for carrying out velocity control, and a pressure control system 35 for carrying out pressure control. Conversion between these controls, that is, a V-P conversion is carried out by means of switches SW1, SW2 in a manner described later.

The velocity control system 31 serves to implement filling velocity control before the V-P conversion. The velocity control system 31 comprises a first feed-back system for outputting a speed command value to the servo-motor 10 on the basis of a difference between a detected value $S_{fb}$ from a position detecting unit for detecting a screw position and a set value $S_{rf}$ from a position setting unit 31-1 for providing a set value of a screw position. In addition, the position detecting unit comprises a speed sensor 31-2 for detecting a rotating speed of the servo-motor 10, and a calculating unit 31-3 for integrating a detected value $V_{fb}$ from the speed sensor 31-2 to calculate a screw position $S_{fb}$. The position detecting unit may be realized by the position detector 34 illustrated in FIG. 1. A signal indicative of the screw position $S_{fb}$ calculated in the calculating unit 31-3 is output to a computing unit 31-4 (first computing unit) to provide for computation of a difference between it and the set value $S_{rf}$.

A signal indicative of such difference (referred hereinbelow to as a first difference signal) is input to a compensator 31-5 (first compensator). The compensator 31-5 outputs a signal indicative of a speed command value for the servo-motor 10 on the basis of the first difference signal thus input. While the filling velocity control is implemented, that is, when the switch SW1 (first switch) is made ON, a difference between the speed command value and the detected value $V_{fb}$ from the speed sensor 31-2 is calculated in a computing unit 31-6 (third computing unit). Such difference signal is given to a motor drive 34 via a speed limiter 32 and a compensator 33. The motor drive 34 controls the servomotor 10 on the basis of an input from the compensator 33.

The pressure control system 35 functions to implement pressure control after the V-P conversion. The pressure control system 35 comprises a second feed-back system for outputting a speed command value to the servo-motor 10 on the basis of a difference between a detected value $P_{fb}$ from a pressure detector 35-1 for detecting resin filling pressure and a set value $P_{rf}$ from a pressure setting unit 35-2 for providing a set value of filling pressure. The pressure detector 35-1 can be realized by the load cell 15 illustrated in FIG. 1. In the second feed-back system, a computing unit 35-3 (second computing unit) calculates a difference between a detected value $P_{fb}$ from the pressure detector 35-1 for detecting resin filling pressure and a set value $P_{rf}$ from the pressure setting unit 35-2. A signal (referred below to as a second difference signal) indicative of the difference is input into a compensator (second compensator) 35-4. The compensator 35-4 outputs a speed command value to the servomotor 10 on the basis of the second difference signal. While the pressure control is implemented, that is, when the switch SW2 is made ON, a difference between the speed command value and the detected value from the speed sensor 31-2 is calculated in a computing unit 31-6. The difference signal is given to the motor drive 34 via the speed limiter 32 and the compensator 33. The motor drive 34 controls the servo-motor 10 on the basis of an input from the compensator 33.

The embodiment has a feature in that with the above-described control device, a necessary pressure waveform can be produced by returning the screw to a set position at a set velocity to effect depressurization when the screw has advanced to a predetermined position in the filling process of injection molding. Concretely, control for returning the screw to the set position to effect depressurization is performed by using the velocity control system 31 to control the servo-motor 10 while the switch SW1 is made ON (the switch SW2 is made OFF). Subsequently, control after the screw has been returned to the set position is performed by using the pressure control system 35 to control the servo-motor 10 while the switch SW2 is made ON (the switch SW1 is made OFF).

Figure 4:
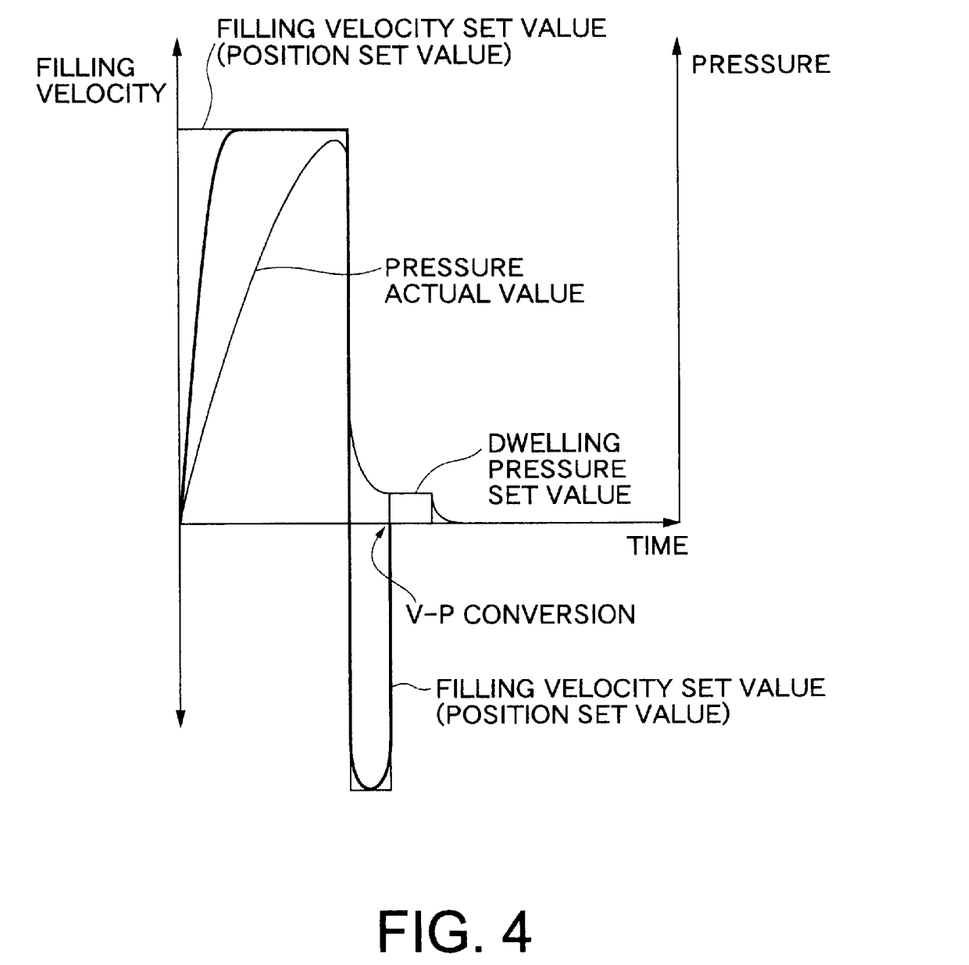
FIG. 4 is a view showing an example of varying waveforms of filling velocity and of resin pressure before and after a V-P conversion according to the present invention.

FIG. 4 shows an example of varying waveforms of filling velocity and of resin pressure before and after the V-P conversion. As apparent from FIG. 4, whether or not the screw has advanced to the predetermined position is detected. A desired pressure waveform is obtained by returning the screw to the set position at the set velocity to effect depressurization control immediately before the V-P conversion when the screw has advanced to the predetermined position.

Figure 5:
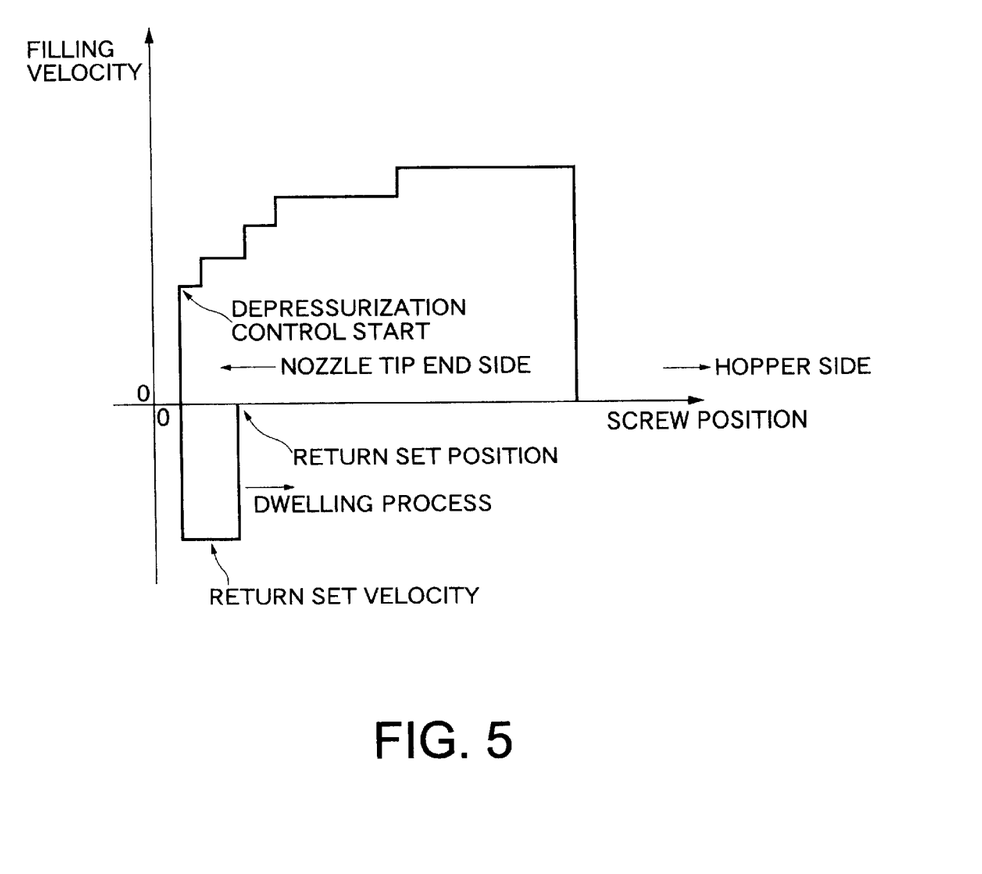
FIG. 5 is a view showing a waveform of screw position-filling velocity in the filling process in multi-stage control.
Figure 6:
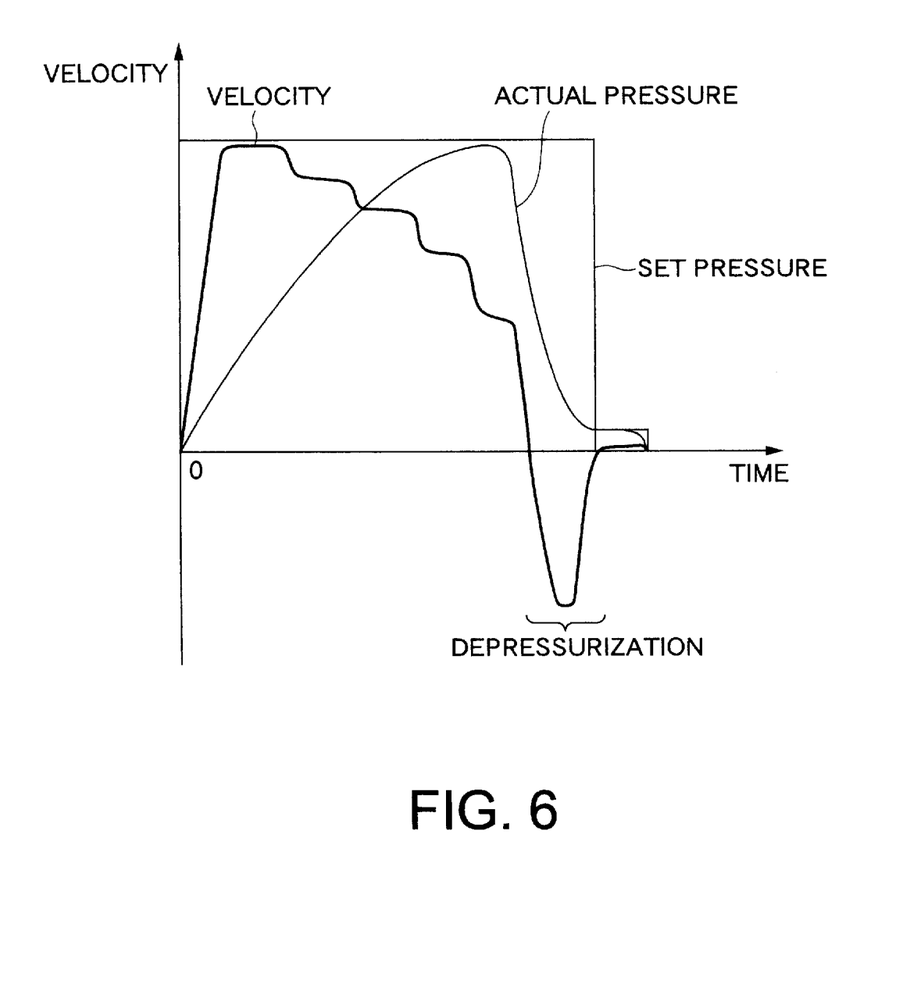
FIG. 6 is a view showing waveforms of time-filling velocity and time-pressure, time-pressure setting and time-actual pressure in the filling process based on multi-stage control.

In addition, FIGS. 2 and 4, respectively, show a state, in which the filling velocity is of one stage, for simplicity. Actually, with the embodiment, the filling process is carried out, as shown in FIGS. 5 and 6, in multi-stage control, in which the filling velocity is switched in accordance with a position of the screw. FIG. 5 shows a waveform for screw position-filling velocity, and FIG. 6 shows a waveform for time-filling velocity, time-pressure setting and time-actual waveform. In this case, depressurization is performed by returning the screw to a separately set position at a separately set velocity after it is detected that the screw has reached a final stage position.

In addition, the present invention is applicable to not only motor driven type injection molding machines but also hydraulic type injection molding machines.

As described previously, the present invention enables rapid depressurization since when the screw has advanced to a predetermined filling position (set value), the screw is returned to a set position at a set velocity whereby the screw can move in response to velocity control. As a result, a necessary pressure waveform can be optionally set to thereby make molding products stable in quality.

What is claimed is:

1. A method of injection molding, said method comprising the steps of:

melting molten resin within a heating cylinder;

advancing an injection screw within the heating cylinder to inject the molten resin into a mold;

retracting the injection screw to a predetermined position before completion of the injection under velocity control;

further advancing the injection screw under pressure control.

2. A method as recited in claim 1, wherein said step of advancing the injection screw is performed under velocity control.

3. A method as recited in claim 1, wherein said steps of advancing and retracting the injection screw are performed under velocity control.

4. A method as recited in claim 1, wherein the step of advancing the injection screw is performed by sequentially advancing the injection screw in a plurality of increments until the screw reaches a predetermined position, then performing the retracting step when the screw has reached a last increment of the plurality of increments.

5. A method as recited in claim 2, wherein the step of advancing the injection screw is performed by sequentially advancing the injection screw in a plurality of increments until the screw reaches a predetermined position, then performing the retracting step when the screw has reached a last increment of the plurality of increments.

6. A method as recited in claim 1, wherein said advancing, retracting, and further advancing steps are performed according to a resin pressure waveform.

7. An injection molding machine control system, said system comprising:

a velocity control system, said velocity control system comprising a position detecting unit for detecting a position of an injection screw, a position setting unit for providing a set value of a position of the injection screw, and a first feedback circuit for outputting a first speed command value to an injection motor based upon a difference between a detected value from the position detecting unit and the set value from the position setting unit;

a pressure control system, said pressure control system comprising a pressure detecting unit for detecting a resin filling pressure, and a pressure setting unit for providing a set value of a filling pressure and a dwelling pressure, and a second feedback circuit for outputting a second speed command value to the injection motor based upon a difference between a detected value from the pressure detecting unit and the set value from the pressure setting unit;

a switching unit for switching between an output of the first feedback circuit and second feedback circuit to provide a selected speed command value to the injection motor;

wherein the velocity control system is configured to perform a control action for returning the injection screw to a set position at a predetermined velocity when the injection screw has advanced to a predetermined position during a filling process, and wherein the switching unit switches to the second feedback circuit thereafter.

8. A control system as recited in claim 7, wherein the filling process is performed by the velocity control system in a plurality of increments, wherein an advancement of the injection screw is controlled in a corresponding plurality of increments based upon the position of the injection screw, and wherein the injection screw is retracted to the set position after the injection screw has reached a position determined by a last increment of the plurality of increments.

9. A control system as recited in claim 7, wherein the position detecting unit comprises a speed sensor for detecting a rotating speed of the injection motor.

10. A control system as recited in claim 9, wherein the position detecting unit also comprises calculating means for integrating a detected value of the speed sensor to calculate the position of the injection screw.

11. A control system as recited in claim 7, wherein the first feedback circuit further comprises a first computing unit for computing a difference between the detected value from the position detecting unit and the set value from the position setting unit to output a first difference signal.

12. A control system as recited in claim 11, wherein said first feedback circuit further comprises a first compensator for outputting the speed command value for the injection motor based upon the first difference signal.

13. A control system as recited in claim 12, wherein the second feedback circuit comprises a second computing unit for computing a difference between the detected value from the pressure detecting unit and the set value from the pressure setting unit to output a second difference signal.

14. A control system as recited in claim 13, further comprising a second compensator for outputting the speed command value for the injection motor based upon the second difference signal.

15. A control system as recited in claim 14, wherein the position detecting unit comprises a speed sensor for detecting a rotating speed of the injection motor.

16. A control system as recited in claim 15, further comprising calculating means connected to the speed sensor for integrating a detected value of the speed sensor to compute the position of the injection screw.

17. A control system as recited in claim 14, wherein said switching unit comprises a first switch connected between the first compensator and a motor drive, and a second switch connected between the second compensator and the motor drive.

18. A control system as recited in claim 17, further comprising a third computing unit connected to an input side of the motor drive, said third computing unit for subtracting a detected value of the speed sensor from the speed command value from the first compensator when the first switch is in an ON condition, and output a result of the subtraction to the motor drive, and to subtract the detected value of the speed sensor from the speed command value from the second compensator when the second switch is in an ON condition, to output a result of the subtraction to the motor drive.

19. An injection molding machine control system, said system comprising:
   velocity control means for controlling an injection screw based on velocity control, said velocity control means comprising position detecting means for detecting a position of the injection screw, position setting means for providing a set value of a position of the injection screw, and first feedback means for outputting a first speed command value to an injection motor based upon a difference between a detected value from the position detecting unit and the set value from the position setting means;
   pressure control means for controlling the injection screw by pressure control, said pressure control means comprising pressure detecting means for detecting a resin filling pressure, and pressure setting means for providing a set value of a filling pressure and a dwelling pressure, and second feedback means for outputting a second speed command value to the injection motor based upon a difference between a detected value from the pressure detecting means and the set value from the pressure setting means;
   switching means for switching between an output of the first feedback means and second feedback means to provide a selected speed command value to the injection motor;
   wherein the velocity control means is configured to perform a control action for returning the injection screw to a set position at a predetermined velocity when the injection screw has advanced to a predetermined position during a filling process, and wherein the switching means switches to the second feedback means thereafter.

20. A control system as recited in claim 19, wherein the filling process is performed by the velocity control means in a plurality of increments, wherein an advancement of the injection screw is controlled in a corresponding plurality of increments based upon the position of the injection screw, and wherein the injection screw is retracted to the set position after the injection screw has reached a position determined by a last increment of the plurality of increments.

21. A control system as recited in claim 19, wherein the position detecting means comprises speed sensor means for detecting a rotating speed of the injection motor.

22. A control system as recited in claim 21, wherein the position detecting means also comprises calculating means for integrating a detected value of the speed sensor means to calculate the position of the injection screw.

23. A control system as recited in claim 19, wherein the first feedback means further comprises first computing means for computing a difference between the detected value from the position detecting means and the set value from the position setting means to output a first difference signal.

24. A control system as recited in claim 23, wherein the first feedback means further comprises first compensator means for outputting the speed command value for the injection motor based upon the first difference signal.

25. A control system as recited in claim 24, wherein the second feedback means comprises second computing means for computing a difference between the detected value from the pressure detecting means and the set value from the pressure setting means to output a second difference signal.

26. A control system as recited in claim 25, further comprising second compensator means for outputting the speed command value for the injection motor based upon the second difference signal.

27. A control system as recited in claim 26, wherein the position detecting means comprises speed sensor means for detecting a rotating speed of the injection motor.

28. A control system as recited in claim 27, further comprising calculating means connected to the speed sensor means for integrating a detected value of the speed sensor to compute the position of the injection screw.

29. A control system as recited in claim 26, wherein said switching means comprises first switch means connected between the first compensator means and a motor drive, and second switch means connected between the second compensator means and the motor drive.

30. A control system as recited in claim 29, further comprising third computing means connected to an input side of the motor drive, said third computing means for subtracting a detected value of the speed sensor means from the speed command value from the first compensator means when the first switch means is in an ON condition, and output a result of the subtraction to the motor drive, and to subtract the detected value of the speed sensor means from the speed command value from the second compensator means when the second switch is in an ON condition, to output a result of the subtraction to the motor drive.

* * * * *